(12) United States Patent
Baranski

(10) Patent No.: US 10,917,945 B2
(45) Date of Patent: Feb. 9, 2021

(54) ELECTRICAL CONNECTOR, GLAZING HAVING THE SAME AND METHOD OF FITTING THE GLAZING

(71) Applicant: Pilkington Group Limited, Lancashire (GB)

(72) Inventor: Detlef Baranski, Marl (DE)

(73) Assignee: PILKINGTON GROUP LIMITED, Lancashire (GB)

( * ) Notice: Subject to any disclaimer, the term of this patent is extended or adjusted under 35 U.S.C. 154(b) by 0 days.

(21) Appl. No.: 16/766,344

(22) PCT Filed: Nov. 26, 2018

(86) PCT No.: PCT/GB2018/053414
§ 371 (c)(1),
(2) Date: May 22, 2020

(87) PCT Pub. No.: WO2019/102225
PCT Pub. Date: May 31, 2019

(65) Prior Publication Data
US 2020/0383178 A1 Dec. 3, 2020

(30) Foreign Application Priority Data
Nov. 24, 2017 (GB) .................................. 1719522.3

(51) Int. Cl.
*H05B 3/84* (2006.01)
*B32B 17/10* (2006.01)

(52) U.S. Cl.
CPC ......... *H05B 3/84* (2013.01); *B32B 17/10036* (2013.01); *H05B 2203/016* (2013.01)

(58) Field of Classification Search
CPC ................ H05B 3/84; H05B 2203/016; B32B 17/10036
(Continued)

(56) References Cited

U.S. PATENT DOCUMENTS 5,534,879 A 7/1996 Braun et al.
5,683,259 A 11/1997 Sato
(Continued)

FOREIGN PATENT DOCUMENTS

DE 4232746 A1 3/1994
DE 102007059818 B3 4/2009
(Continued)

OTHER PUBLICATIONS

International Search Report (PCT/ISA/210) and Written Opinion (PCT/ISA/237) dated Feb. 15, 2019, by the European Patent Office as the International Searching Authority for International Application No. PCT/GB2018/053414, 13pgs.
(Continued)

*Primary Examiner* — Sherman Ng

(74) *Attorney, Agent, or Firm* — Buchanan Ingersoll & Rooney PC

(57) ABSTRACT

An electrical connector for connecting to an electrical component in or on a glazing, comprising at least one electrical conductor having first and second ends; a layer at least partly covering the at least one electrical conductor and located between the first and second ends, wherein the layer comprises a flat region having a first surface for bonding to a glazing via an adhesive layer and having a second surface for bonding to a flange of an aperture via an adhesive bead and having at least two straight sides and a discontinuity arranged in each of the at least two straight sides so that in use mounted on a glazing the discontinuity forms a receptacle for receiving an adhesive bead to form a seal against water ingress along each of the two straight sides.

20 Claims, 6 Drawing Sheets

(58) Field of Classification Search
USPC .......................................................... 174/84 R
See application file for complete search history.

(56) References Cited

U.S. PATENT DOCUMENTS

| | | | |
|---|---|---|---|
| 5,951,322 A | 9/1999 | Nishikigi | |
| 6,008,473 A | 12/1999 | Gillner et al. | |
| 7,180,031 B1 * | 2/2007 | Loibl | H05B 3/06 |
| | | | 219/203 |
| 2010/0193242 A1 * | 8/2010 | Derda | H05B 3/84 |
| | | | 174/88 R |
| 2010/0294566 A1 | 11/2010 | Reul | |

FOREIGN PATENT DOCUMENTS

| | | |
|---|---|---|
| EP | 0593940 A1 | 4/1994 |
| EP | 2098098 B1 | 2/2015 |
| FR | 2913141 A3 | 8/2008 |
| WO | 2008074894 A1 | 6/2008 |
| WO | 2013022124 A1 | 2/2013 |
| WO | 2017194961 A1 | 11/2017 |

OTHER PUBLICATIONS

Search Report dated May 9, 2018, by the British Patent Office for Application No. 1719522.3, 5pgs.

\* cited by examiner

ELECTRICAL CONNECTOR, GLAZING HAVING THE SAME AND METHOD OF FITTING THE GLAZING

FIELD OF THE INVENTION

The invention concerns an electrical connector, a glazing having the same and a method of fitting the glazing in an aperture. The electrical connector and the glazing are suitable for a vehicle window, a window in a building, a refrigerator door or digital signage.

Electrical connectors are known for connecting to an electrical component, such as an antenna, a heater or a sensor, arranged on or in a glazing. The electrical connector is arranged on the glazing and a sealant is applied. The glazing is fitted to an aperture in a body, such as a vehicle body, sealing the aperture against water ingress.

PRIOR ART DOCUMENTS

DE4232746A1 (Paulus) discloses an electrical connector, comprising a metal strip embedded in a flat moulding of plastic. The flat moulding is bonded to a laminated glass and has indentations in its sides so that its cross-sectional area is small in the middle. An extrusion nozzle, applying an adhesive bead to the laminated glass for bonding to a vehicle body, can pass over the moulding without obstruction due to the small cross-sectional area.

U.S. Pat. No. 5,534,879A (Braun) discloses an electrical connector having a thin metal foil strip comprising an inner section for connection to an electrical component between two panes of a laminated glass, an outer section adapted to be bonded to the laminated glass and at least a fold location for folding around an edge of a pane.

WO2017194961A1 (Baranski) discloses an electrical connector having a wide portion, a linear portion and an input portion, optionally arranged at 90 degrees to the linear portion.

FR2913141A3 (Habrard) discloses a flat cable, thickness from 10 to 100 μm.

WO2008074894A1 (Menu), discloses an alternative to the above-mentioned flat cables suitable for an openable glazing of a vehicle. A connector is shaped to receive an edge region of an automotive glazing between opposing first and second connector arms.

WO2013022124A1 (Jinno) discloses a waterproof connector, not specifically for a vehicle glazing. A flat cable has a pair of cut-out parts formed at positions which are entirely covered with a connector housing. A resin forming the connector housing enters the pair of cut-out parts such that the connector housing is strongly held on the flat cable.

U.S. Pat. No. 5,951,322A (Nishikigi) discloses another flat cable connecting structure, not specifically for a vehicle glazing.

U.S. Pat. No. 5,683,259A (Sato) discloses a rotary connector, not specifically for a vehicle glazing, comprising a flat cable having a cut-out (notch) formed on a side surface thereof, for engaging a holding arm.

Problem to be Solved

The present inventor has found a problem that a conventional flat cable electrical connector mounted on a glazing is, in use, an obstacle to an adhesive bead applied to the glazing, so the adhesive bead does not adhere to a side of the electrical connector or an adjacent region of the glazing. A gap is formed between the adhesive bead, the electrical connector and the adjacent region of the glazing. After the adhesive bead is pressed against a vehicle body, the gap remains and forms a channel for water to enter the vehicle. So, the adhesive bead fails to seal the vehicle against water ingress because of the gap.

It is an object of the present invention to solve this problem by providing an electrical connector which, when mounted on a glazing and an adhesive bead is applied thereto, prevents ingress of water.

SUMMARY OF THE INVENTION

The present invention provides, in a first aspect, an electrical connector according to claim 1.

An electrical connector for connecting to an electrical component in or on a glazing, comprising at least one electrical conductor having first and second ends; a layer covering at least part of the at least one electrical conductor and located between the first and second ends, wherein the layer comprises a flat region having a first surface for bonding to a glazing via an adhesive layer and having a second surface for bonding to a flange of an aperture via an adhesive bead and having at least two straight sides characterised by a discontinuity arranged in each of the at least two straight sides so that in use mounted on a glazing the discontinuity forms a receptacle for receiving an adhesive bead to form a seal against water ingress along each of the two straight sides.

Flat region is defined by thickness 1 mm or less and width at least ten times the thickness. Preferably first and second surfaces are partly or completely flat. Preferably first and second surfaces are parallel with each other.

Preferably an adhesive layer is bonded to the first surface forming an integrated piece with the electrical connector. Preferably the adhesive layer extends to cover the layer between the flat region and the first or second end. Advantageously, the adhesive layer forms an integrated piece with the electrical connector so as to provide a better seal with an adhesive bead and so as to be more easily embedded in an interlayer of laminated glass.

Preferably discontinuity forms a receptacle for receiving adhesive bead.

Preferably a width of the flat region is greater than a width of the layer adjacent the first or second end. The inventor has found that the width of the flat region serves to optimise a pull-off force to remove the electrical connector from the glazing. In a preferred embodiment, the electrical connector achieves a pull-off force greater than 10 N so it does not detach from the glazing even if it is used to bear some of the weight of the glazing. By contrast, the inventor has found the width of the layer adjacent first or second ends should be equal to or less than the width of the flat region, to make a flexible flying lead or to be easily embedded in an interlayer of laminated glass.

Preferably the layer is an electrical insulator. Preferably first and second ends are not covered by the layer. Preferably the layer comprises a base layer as a substrate for the conductor and a cover layer bonded to cover the conductor and to encapsulate it. In an advantageous embodiment, the electrical connector has at least one junction on the flat region and a second end of the electrical conductor is a wire lead connected to the junction. Preferably the wire lead is not covered by the layer.

Preferably the electrical connector comprises at least two electrical conductors.

Preferably the layer comprises at least a first fold location, preferably dimensioned to be folded around an edge of a ply of glazing material and adjacent the first end. Preferably the layer further comprises a second fold location adjacent the first fold location for use on laminated glass. Preferably the layer further comprises a second fold location positioned adjacent the second end. An inverted fold location allows the electrical connector to "lift off" from the glazing where the electrical connector is not bonded to the glazing by means of the adhesive layer. Alternatively, a fold location allows the electrical connector to fold around an edge of a ply of glazing material. First and second fold locations allow the electrical connector to fold through 180 degrees around an edge of a ply of glazing material so that a first end can be incorporated in an interlayer of a laminated glass.

Preferably the discontinuity comprises at least one edge orientated relative to the straight side in a range from 60 to 120 degrees, more preferably from 70 to 110 degrees, most preferably from 80 to 100 degrees.

Preferably the discontinuity is shaped as a segment of an ellipse, more preferably a segment of a circle, a semi-circle, a triangle, a square, a rectangle, a trapezoid, a parallelogram or a combination thereof. These examples are not limiting.

Preferably the discontinuity is an indentation or a protrusion. Preferably the electrical connector comprises two indentations such that the flat region has a violin shape.

The present invention provides, in a second aspect, a glazing according to claim 10.

Preferably the glazing further comprises a second ply of glazing material and a ply of interlayer material extending between the first and second plies of glazing material, preferably having an electrical component on the ply of interlayer material and the first end is electrically connected thereto.

Preferably the glazing further comprises an adhesive layer on the second ply of glazing material and the flat region is bonded thereto.

Preferably the adhesive layer comprises a straight side and a discontinuity arranged therein, preferably in alignment with the straight side and the discontinuity of the flat region, more preferably forming a receptacle for receiving adhesive bead.

The present invention provides, in a third aspect, a method of fitting a glazing according to claim 14.

Preferably the method of fitting a glazing comprises a step of applying the adhesive bead in a direction perpendicular to the straight side, preferably by an extrusion nozzle, more preferably in the shape of a teardrop or a triangle.

Effect of the Invention

The invention provides an electrical connector comprising a flat region having a straight side and a discontinuity therein. The discontinuity forms a receptacle for receiving adhesive bead. When the electrical connector is mounted on a glazing and pressed against an aperture, adhesive bead flows in a direction parallel to the straight side and seals against an edge of the receptacle. A water channel between the adhesive bead, the glazing and the electrical connector is blocked by a residue of adhesive bead formed in the receptacle as a blockage preventing ingress of water. Thus, a seal is provided for an aperture such as for a vehicle window, a window of a building, a refrigerator door or digital signage. Preferably, an electrical connector having an adhesive layer bonded to the flat region and to a region between first and second fold locations is provided with straight sides and discontinuities aligned with those of the flat region, to form an integrated piece, capable of providing a seal against water ingress.

DETAILED DESCRIPTION OF THE DRAWINGS

Figure 1:
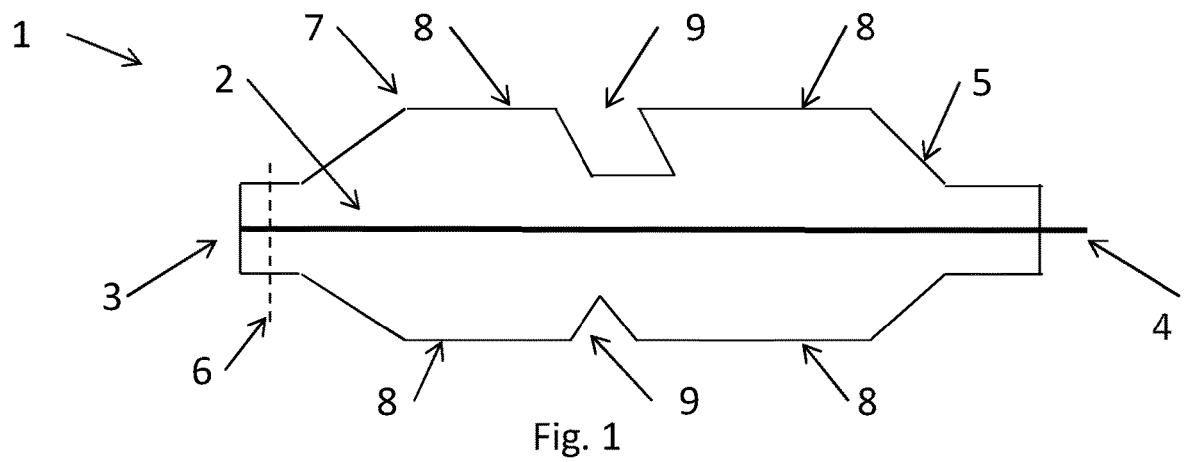
FIG. 1 shows an electrical connector according to the invention with two indentations.

FIG. 1 is a plan view of an electrical connector (1) according to the invention, comprising at least one electrical conductor (2) having first and second ends (3, 4); a layer (5) covering at least part of the at least one electrical conductor (2) and located between the first and second ends (3, 4). The electrical connector (1) comprises at least a fold location (6), suitable for monolithic glazing, such as a toughened glass for a side window of a vehicle and comprises a flat region (7) having two discontinuities, both indentations (9), in the shape of a parallelogram and a triangle respectively.

Figure 2:
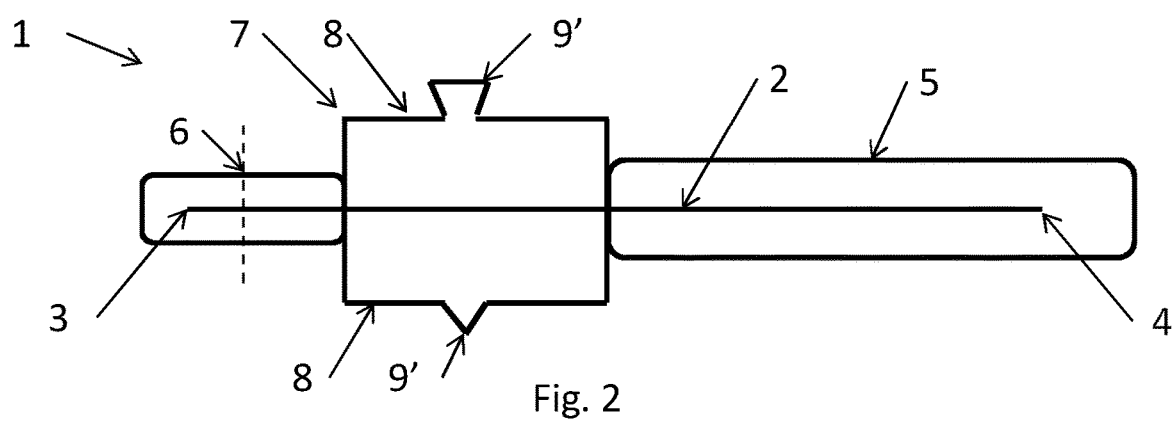
FIG. 2 shows an electrical connector according to the invention with two protrusions.

FIG. 2 is a plan view of an electrical connector (1) according to the invention having two discontinuities, both protrusions (9', in the shape of a trapezoid and a triangle.

Figure 3:
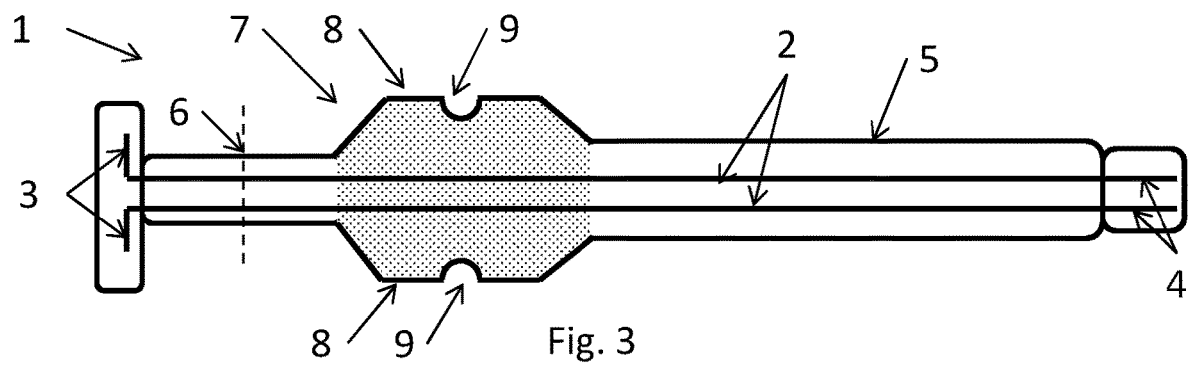
FIG. 3 shows an electrical connector according to the invention with exposed ends.

FIG. 3 is a plan view of an electrical connector (1) according to the invention having two discontinuities, both indentations (9), in the shape of a semi-circle. The electrical connector comprises two electrical conductors (2) and two end regions (3, 4) where the electrical conductors (2) are not covered with a layer (5) of insulation.

Figure 4:
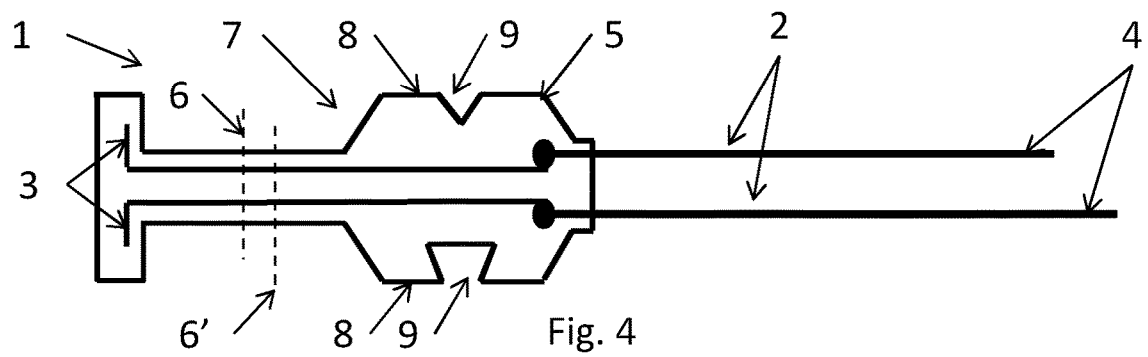
FIG. 4 shows an electrical connector according to the invention with fold locations.

FIG. 4 is a plan view of an electrical connector (1) according to the invention having two discontinuities, both indentations (9), shaped as a triangle and a trapezoid respectively. The electrical connector (1) comprises first and second fold locations (6, 6', suitable for folding through 180 degrees around an edge of a ply of glazing material (12) so that a first end (3) can be incorporated in an interlayer (13) of a laminated glass. There are two electrical conductors (2), each comprising a junction located on the flat region and having wire leads connected to the junctions forming second ends (4) of the conductors.

Figure 5:
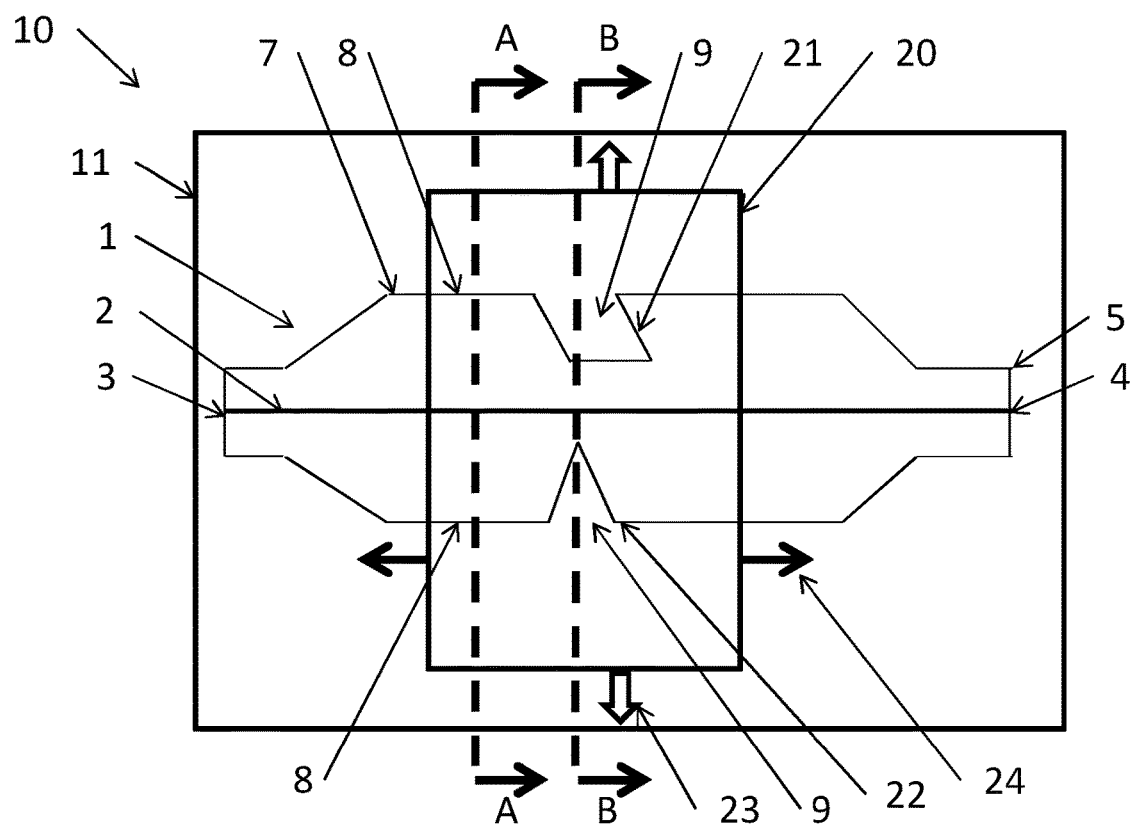
FIG. 5, FIG. 5*a* and FIG. 5*b* show a monolithic glazing according to the invention.

FIG. 5 is a plan view of a monolithic glazing (10) according to the invention, so that first and second ends (3, 4) of the electrical conductor (2) are adjacent the same surface of the glazing (10) and having an electrical connector (1) comprising two discontinuities (9), like FIG. 1. Also shown is an adhesive bead (20) applied to the glazing (10) and to the flat region (7). A first axis A-A perpendicular to the longitudinal axis of the electrical connector (1) intersects the adhesive bead (20) at the straight sides (8) of the flat region (7). A second axis B-B perpendicular to the longitudinal axis of the electrical connector (1) intersects the adhesive bead (20) within the two discontinuities (9).

Figure 5A:
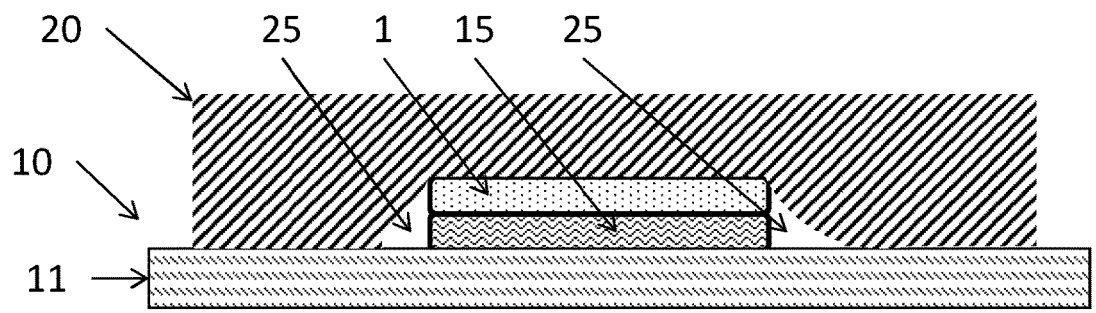

FIG. 5a is a cross-section on A-A of the glazing (10) of FIG. 5 according to the invention. An adhesive bead (20) covers the electrical connector (1) and an adhesive layer (15) below it, leaving on each side a gap forming a water channel (25).

Figure 5B:
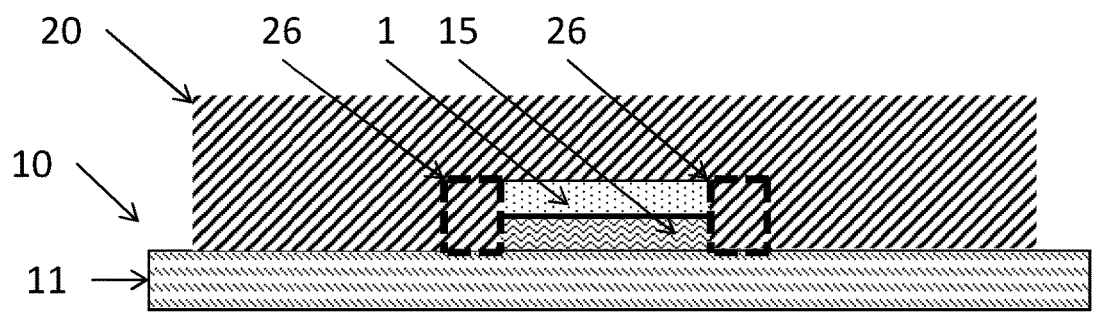

FIG. 5b is a cross-section on B-B of the glazing (10) of FIG. 5 according to the invention. The adhesive bead (20) is received in receptacles formed by the discontinuities (9) and forming on each side a blockage (26) in the water channel.

Figure 6:
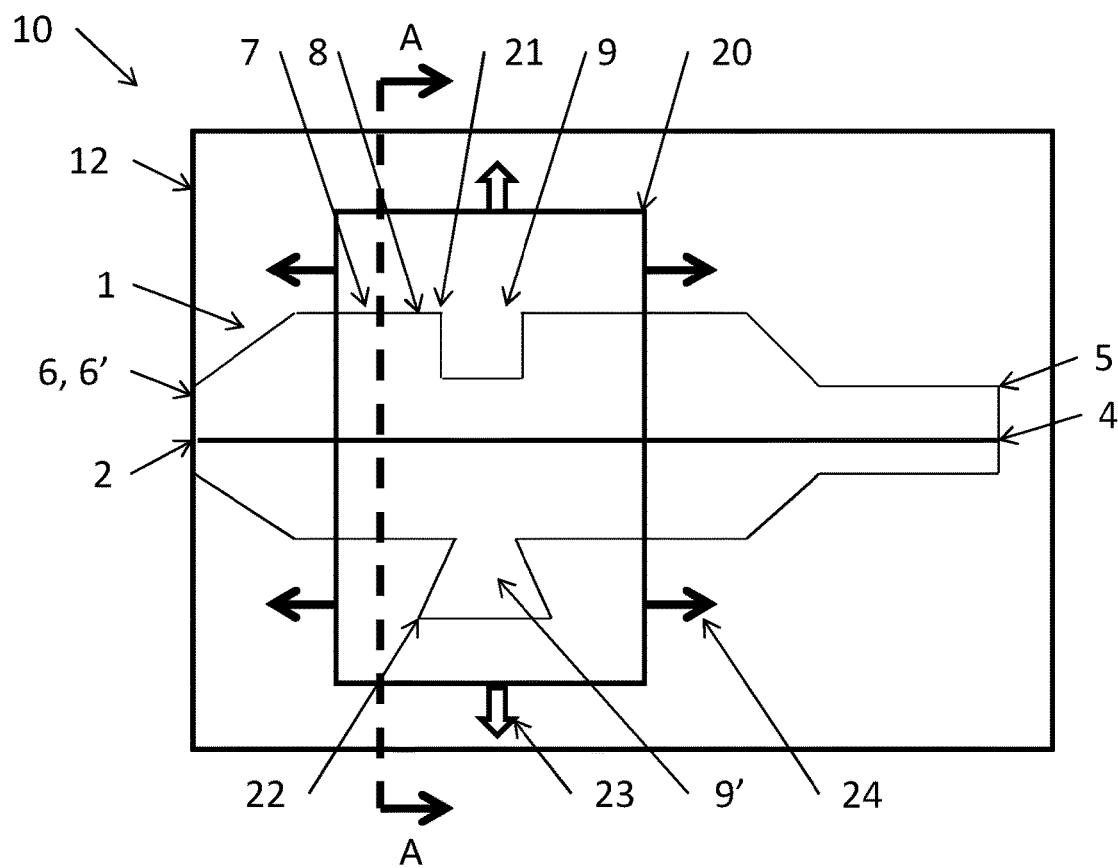
FIG. 6 and FIG. 6*a* show a laminated glass according to the invention.

FIG. 6 is a plan view of a laminated glass (10) according to the invention. An axis A-A perpendicular to a longitudinal axis of the electrical connector (1) intersects the discontinuities (9, 9') at the straight sides of the flat region.

Figure 6A:
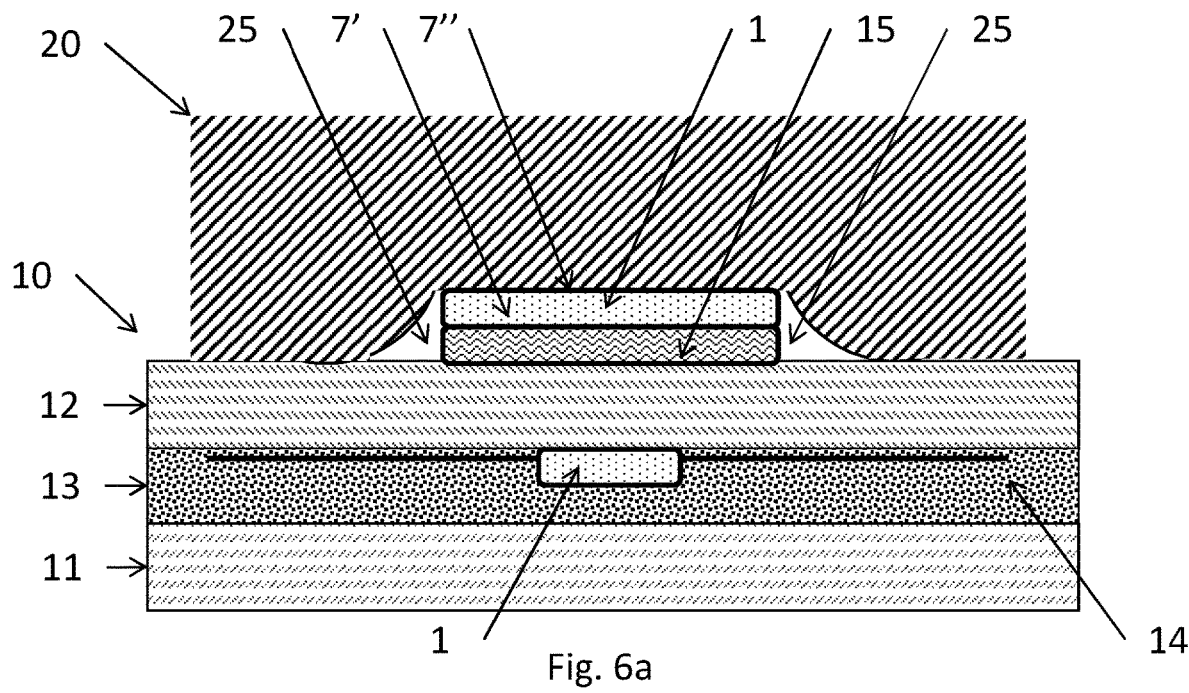

FIG. 6a is a cross-section on A-A of the laminated glass (10) of FIG. 6 according to the invention. Water channels are shown adjacent the edges of the straight sides. A first end is folded around an edge of a ply of glazing material to contact an electrical component, such as a busbar (14), and the first end is embedded in a ply of interlayer material (13).

Figure 7:
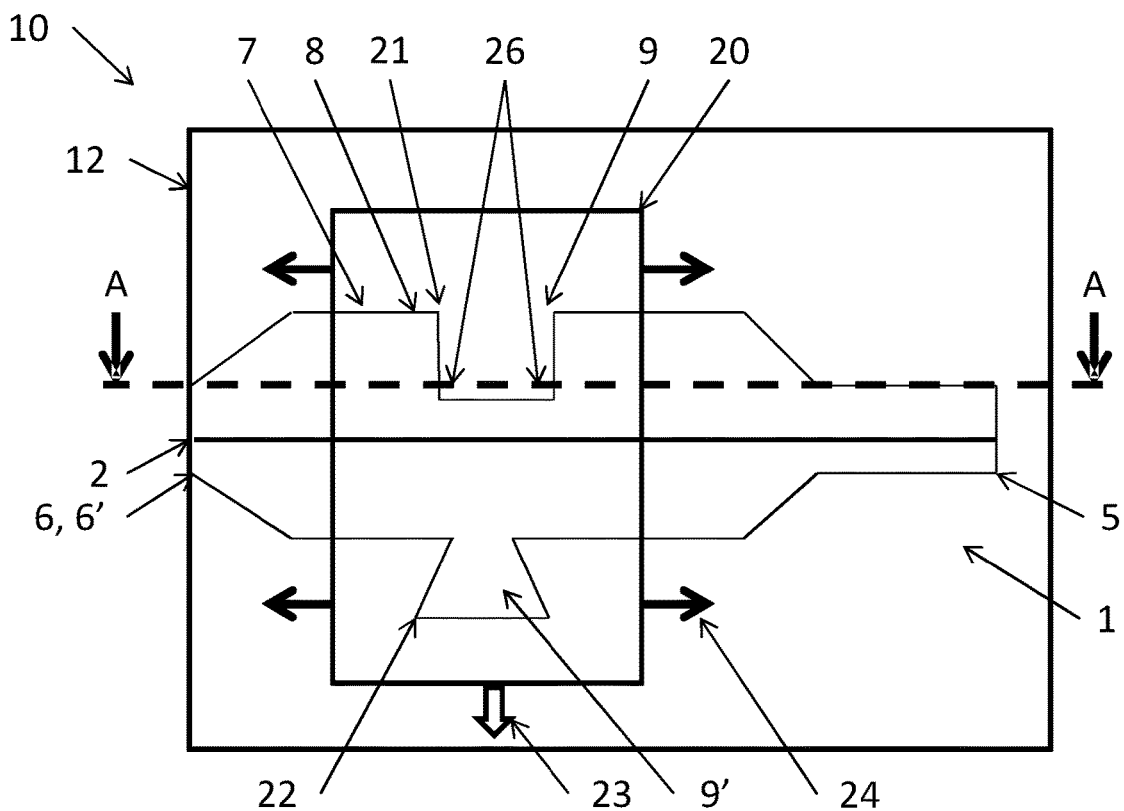
FIG. 7 and FIG. 7*a* show another laminated glass according to the invention.

FIG. 7 is a plan view of a laminated glass (10), for example a vehicle windscreen, according to the invention. Discontinuities are an indentation (9) and a protrusion (9') shaped as a rectangle and a trapezoid respectively. An axis A-A parallel to a longitudinal axis of the electrical connector (1) is located so as to intersect two edges of a discontinuity at positions where blockages (26) in a water channel are formed.

Figure 7A:
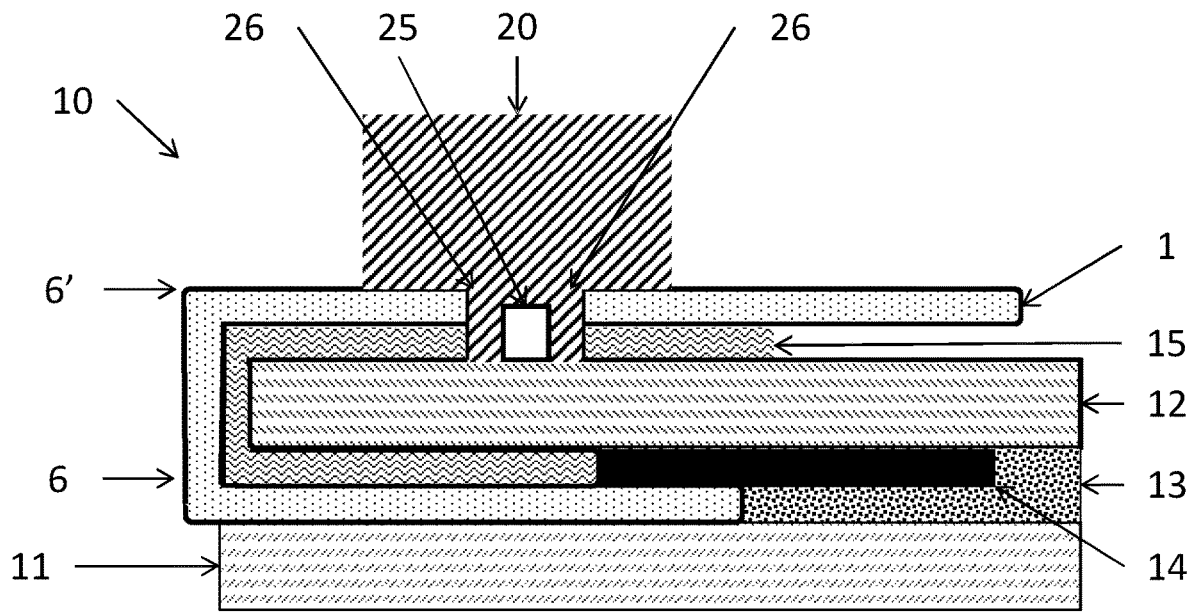

FIG. 7a is a cross-section on A-A of the laminated glass (10) of FIG. 7 according to the invention. Blockages (26) are shown adjacent the edges of the discontinuity (9). Water channel (25) is blocked by two blockages (26) preventing water ingress. An adhesive layer (15) extends under the electrical connector as an integrated piece, bonding the electrical connector to the ply of glazing material. A fold location (6) and a second fold location (6') allow the electrical connector to fold around an edge of a ply of glazing material (12), preferably through 180 degrees.

Figure 8:
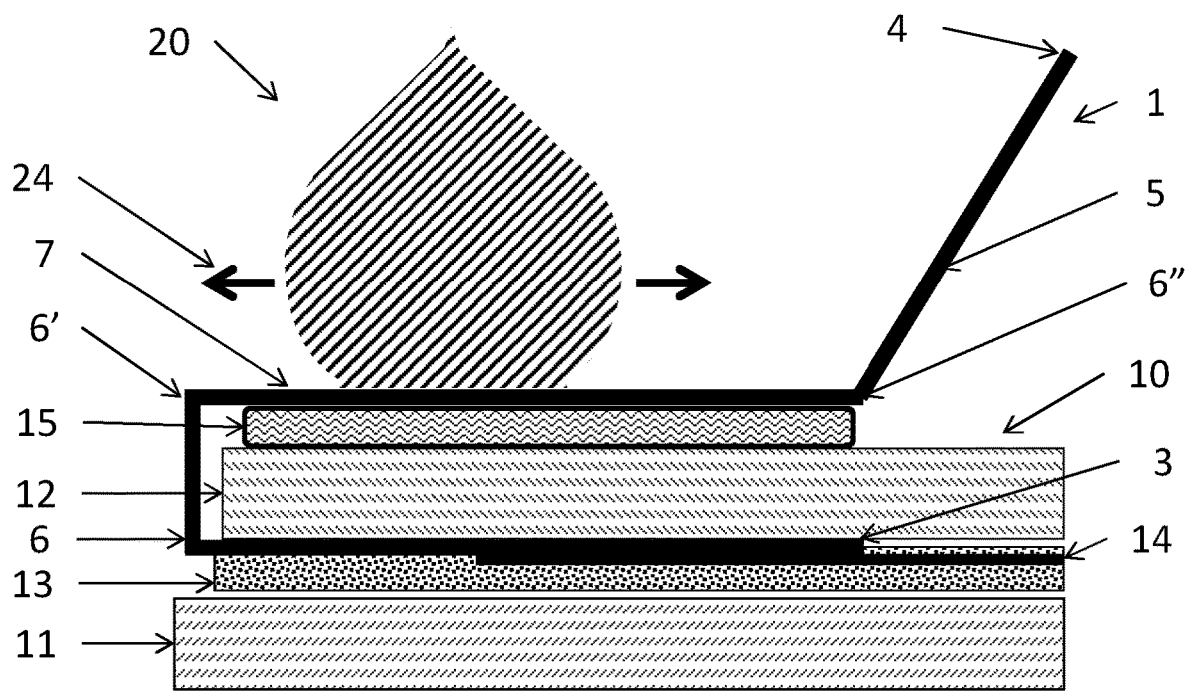
FIG. 8 and FIG. 9 show fitting a laminated glazing according to the invention.

FIG. 8 is a cross-section on the axis of the electrical conductor (1) on the laminated glazing (10) of FIG. 7a according to the invention. The adhesive bead (20) in cross-section is in the form of a teardrop. Preferably the adhesive bead (20) is applied in a direction (23) perpendicular to an axis of the electrical connector (1) and is free to move in a direction (24) parallel to a straight side (8) of the flat region (7).

Figure 9:
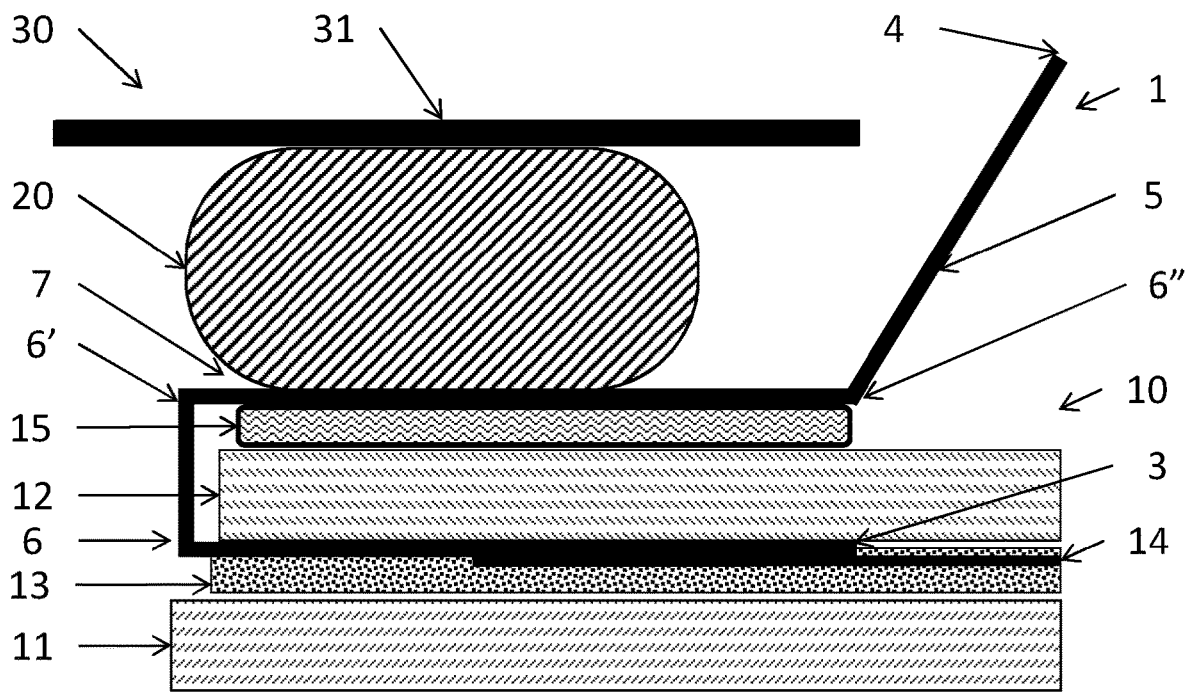

FIG. 9 shows a laminated glazing (10) fitted in an aperture (30). The adhesive bead (20) is in the form of a barrel, after pressing against a flange (31) of an aperture (30), i.e. having flowed in a direction (24) parallel to the straight side (8) of the flat region (7).

Figure 10:
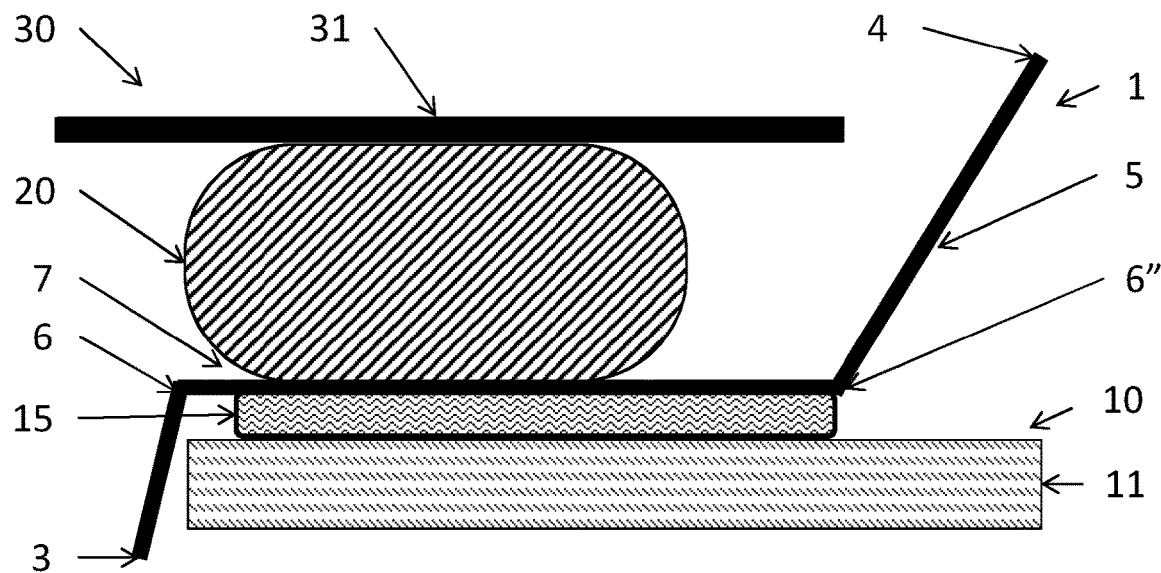
FIG. 10 and FIG. 11 show fitting a monolithic glazing according to the invention.

FIG. 10 shows a monolithic glazing in an aperture (30). The electrical connector (1) has a first fold location (6) and preferably the fold is less than 90 degrees. A second fold location inverted (6") allows the electrical connector to "lift off" from the glazing (10).

Figure 11:
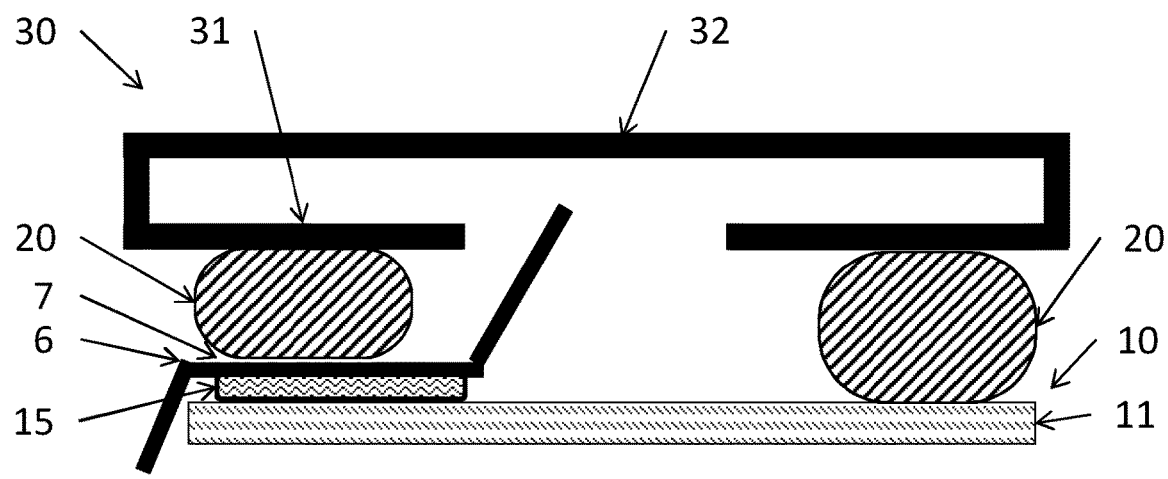

FIG. 11 shows a vehicle body (32) in cross-section supporting a flange (31) of an aperture (30). At a first point on the flange (31) the adhesive bead (20) bonds the flange (31) to the glazing (10) via the electrical connector (1) and an adhesive layer (15). At a second point on the flange (31) an adhesive bead (20) bonds the flange (31) directly to the glazing (10).

BEST MODE FOR CARRYING OUT THE INVENTION

Electrical Connector

An electrical connector (1) is provided for connecting to an electrical component (14) in or on a glazing (10). In a glazing, electrical components (14) for example wire antennas or copper busbars or wire heating elements are arranged between plies of glazing material (11, 12) of laminated glass or printed on inner surfaces of a laminated glazing. On a glazing (10), electrical components (14) such as antennas or heating elements may be printed on the surfaces of a monolithic glazing or on outer surfaces a laminated glazing.

The electrical connector (1) comprises at least one electrical conductor (2) having first and second ends (3, 4). The conductor (2) may comprise a metal strip, e.g. made of copper having thickness in a range 10 µm to 0.9 mm. Any conductive material may be used.

The electrical connector (1) comprises a layer (5) covering the at least one electrical conductor (2) and located between the first and second ends (3, 4). Preferably the layer (5) is an electrical insulator, for example polyimide, in particular DuPont Kapton® trademark belonging to E. I. du Pont de Nemours and Company, and obtainable from DuPont Electronic Technologies, Circleville, Ohio, USA.

The layer (5) comprises a flat region (7) located between the first and second ends (3, 4) having a first surface (7') for bonding to a glazing (10) via an adhesive layer (15), and having a second surface (7") for bonding to a flange (31) of an aperture (30) via an adhesive bead (20), and having at least two straight sides (8). Flat region (7) has thickness 1 mm or less and width at least ten times the thickness. First and second surfaces (7', 7") are preferably at least partly flat, preferably having a surface texture for better bonding to adhesive layer (15) or adhesive bead (20).

An example of an electrical connector (1) in FIG. 3 has a flat region (7) having length 21 mm and width 20 mm. A region between the flat region (7) and a first end (3) has length 23 mm and width 8 mm. A region between the flat region (7) and a second end (4) has length 50 mm and width 10 mm. An adhesive layer (15) has length 40 mm, covering the flat region (7) and the region between the flat region (7) and the first end (3), except a region between the first end (3) and a first fold location (6). Conductor (2) is a copper strip, thickness 35 µm, insulated by the layer (5) comprising a base layer, thickness 25 µm and a cover layer, thickness 25 µm, sandwiching the conductor (2) and bonded together by, for example, double-sided tape. Colour of the layer (5) may be selected by adding pigments in the materials of the layer (5), or by applying paint to a surface of the layer (5). Colour of the layer (5) is preferably black so as to be camouflaged against black print on the glazing (10) or transparent so as to be inconspicuous, as disclosed in FR2913141A3.

The flat region (7) has a discontinuity (9, 9') in each of the two straight sides (8). Discontinuity may be an indentation (9) or a protrusion (9'). Any shape of discontinuity may be used. In the example, discontinuity (9) is in the shape of a semi-circle, diameter 5 mm in each of two straight sides (8) of the flat region (7). Each discontinuity (9) forms a receptacle indented 2.5 mm (i.e. half the diameter) from the straight side (8).

An adhesive layer (15) is preferably attached to the first surface (7') forming an integrated piece. Preferably the shape of the discontinuity (9) is cut in the layer (5) and the adhesive layer (15) at the same time, so edges are aligned. Adhesive layer (15) is preferably double-sided adhesive tape, for example obtainable from 3M at St Paul, Minn., USA, type 966 Adhesive Transfer Tape, thickness 50 μm. Preferably the adhesive layer (15) comprises a release liner to protect an adhesive surface from the environment. Release liner may extend outside an adhesive surface for better manual detaching.

Second end (4) of the electrical conductor (2) may be arranged at any angle to the straight side (8), for example 90 degrees, i.e. parallel with an edge of a body (32) having an aperture (30), as in WO2017194961A1, incorporated by reference herein in its entirety.

Glazing

A glazing having a connector according to the invention comprises at least a first ply of glazing material (11). Glazing material may be float glass, for example having thickness in a range from 1 mm to 25 mm, preferably from 1.5 mm to 6 mm. Glazing material may be annealed glass, semi-toughened glass or toughened glass. Glass composition may be any known composition, in particular soda lime silica glass, for example infrared absorbing glass. Glazing material may have any known functional coating, deposited by any known method, for example infrared reflective coating comprising a transparent conductive oxide, deposited by chemical vapour deposition or magnetron sputtering.

A glazing may comprise first and second plies of glazing material (11, 12) and a ply of interlayer material (13) extends between the first and second plies of glazing material and bonds them together. Interlayer material (13) may be a polymer, for example polyvinyl butyral (PVB). Additional plies of interlayer material (13), for example polyethylene terephthalate (PET), optionally bearing a functional coating, may be used. The functional coating may be an electrical conductor serving as an electrical component (14).

The glazing (10) comprises an electrical connector (1) mounted on the glazing (10), preferably by means of an adhesive layer (15), for example double-sided adhesive tape.

Method of Fitting a Glazing

Method of fitting a glazing (10) having an electrical connector (1) mounted thereon in an aperture (30) comprises steps of providing a glazing (10), applying an adhesive bead (20) on at least the flat region (7) of the electrical connector (1) having a straight side (8) and a discontinuity (9) therein and pressing the glazing (10) against a flange (31) of the aperture thereby causing adhesive bead (20) to flow in a direction (24) parallel to the straight side (8), squeezing adhesive bead (20) against an edge (21) of the discontinuity.

Adhesive bead (20) material may be a polymer, for example polyurethane.

Adhesive bead (20) is preferably applied in a direction (23) perpendicular to the straight side (8) using a nozzle. Preferably nozzle diameter is in a range 5 mm to 25 mm.

Use of the Glazing

Monolithic glass or laminated glass (10) having an electrical connector (1) according to the invention is used for architectural applications, to improve safety or security of heated glazing buildings, automotive applications such as vehicle windscreens, side windows, rear windows and roof windows, heated glazing applications including refrigerator doors, white goods and furniture or electronic applications such as digital signage and photovoltaics.

KEY TO THE DRAWINGS

1—Electrical connector
2—Electrical conductor
3, 4—First and second ends of the electrical conductor
5—Layer at least partly covering the electrical conductor
6, 6'; 6"—First and second fold location; second fold location inverted
7—Flat region of the layer
8—Straight side of the flat region
9, 9'—Discontinuity in the straight edge; 9=indentation, 9'=protrusion
10—Glazing
11, 12—First and second plies of glazing material
13—Ply of interlayer material
14—Electrical component
15—Adhesive layer
20—Adhesive bead
21, 22—Edge of discontinuity, partly bounding a receptacle for receiving adhesive bead
23—Direction of nozzle movement to install adhesive bead on glazing
24—Flow direction parallel to straight side for adhesive bead when pressed against flange
25, 26—Water channel; Blockage in water channel
30; 31; 32—Aperture; Flange of the aperture; Body having an aperture

The invention claimed is:

1. Electrical connector for connecting to an electrical component in or on a glazing, comprising:
    a) at least one electrical conductor having first and second ends;
    b) a layer at least partly covering the at least one electrical conductor and located between the first and second ends,
    wherein the layer comprises:
    c) a flat region having a first surface for bonding to a glazing via an adhesive layer and having a second surface for bonding to a flange of an aperture via an adhesive bead and having at least two straight sides
    d) a discontinuity arranged in each of the at least two straight sides so that in use mounted on a glazing the discontinuity forms a receptacle for receiving an adhesive bead to form a seal against water ingress along each of the two straight sides.

2. The electrical connector according to claim 1, wherein the first and second surfaces are flat and preferably parallel with each other.

3. The electrical connector according to claim 1, comprising an adhesive layer bonded to the first surface.

4. The electrical connector according to claim 1, wherein a width of the flat region is greater than the width of the layer adjacent the first or second ends.

5. The electrical connector according to claim 1, wherein the layer is an electrical insulator.

6. The electrical connector according to claim 1, wherein the layer comprises at least a first fold location.

7. The electrical connector according to claim 1, wherein the discontinuity comprises at least one edge orientated relative to the straight side in a range from 60 to 120 degrees.

8. The electrical connector according to claim 1, wherein the discontinuity is shaped as a segment of an ellipse.

9. The electrical connector according to claim 1, wherein the discontinuity is an indentation or a protrusion.

10. Glazing comprising:
    a) at least a first ply of glazing material
    b) an electrical connector according to claim 1 mounted on the glazing.

11. The glazing according to claim 10, further comprising a second ply of glazing material and a ply of interlayer material extending between the first and second plies of glazing material.

12. The glazing according to claim 10, further comprising an adhesive layer on the second ply of glazing material and the flat region is bonded to the adhesive layer.

13. The glazing according to claim 12, wherein the adhesive layer comprises a straight side and a discontinuity arranged therein.

14. A method of fitting a glazing having an electrical connector mounted thereon in an aperture, the method comprising:
   a) providing a glazing according to claim 10;
   b) applying an adhesive bead on the flat region;
   c) pressing the glazing against a flange of the aperture thereby causing adhesive bead to flow in a direction parallel to the straight side and squeezing adhesive bead against an edge of the discontinuity.

15. The method of fitting a glazing according to claim 14, further comprising applying the adhesive bead in a direction perpendicular to the straight edge.

16. The electrical connector according to claim 5, wherein the first and second ends of the at least one electrical conductor are not covered by the electrical insulator layer.

17. The electrical connector according to claim 6, wherein the first fold location is dimensioned to be folded around an edge of a ply of glazing material adjacent the first end, and further comprising at least a second fold location dimensioned to be folded around the edge of the ply of glazing material adjacent the first end.

18. The electrical connector according to claim 1, wherein the discontinuity is shaped as a segment of a circle, a semi-circle, a triangle, a square, a rectangle, a trapezoid or a parallelogram.

19. The glazing according to claim 11, further comprising an electrical component on the ply of interlayer material and the first end is electrically connected to the electrical component.

20. The method of fitting a glazing according to claim 15, wherein the applying of the adhesive bead is performed by an extrusion nozzle in a shape of a teardrop or a triangle.

* * * * *